United States Patent
Chakraborty et al.

(10) Patent No.: US 11,494,637 B2
(45) Date of Patent: Nov. 8, 2022

(54) LAYER-WISE DISTILLATION FOR PROTECTING PRE-TRAINED NEURAL NETWORK MODELS

(71) Applicant: International Business Machines Corporation, Armonk, NY (US)

(72) Inventors: Supriyo Chakraborty, White Plains, NY (US); Mattia Rigotti, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 16/367,448

(22) Filed: Mar. 28, 2019

(65) Prior Publication Data
US 2020/0311540 A1    Oct. 1, 2020

(51) Int. Cl.
*G06N 3/08*     (2006.01)
*G06F 21/62*    (2013.01)
*G06N 3/02*     (2006.01)

(52) U.S. Cl.
CPC ........... *G06N 3/08* (2013.01); *G06F 21/6227* (2013.01); *G06N 3/02* (2013.01)

(58) Field of Classification Search
CPC ......... G06N 3/08; G06N 3/02; G06F 21/6227
See application file for complete search history.

(56) References Cited

U.S. PATENT DOCUMENTS

2004/0025044 A1   2/2004  Day
2017/0046598 A1   2/2017  Osindero
2018/0018590 A1 * 1/2018  Szeto ............... G06N 20/10
2018/0349769 A1  12/2018  Mankovskii et al.
(Continued)

FOREIGN PATENT DOCUMENTS

WO   WO-2018217635 A1 * 11/2018  ............. G06F 8/76

OTHER PUBLICATIONS

Zou J., Han Y., So SS. (2008) Overview of Artificial Neural Networks. In: Livingstone D.J. (eds) Artificial Neural Networks. Methods in Molecular Biology™, vol. 458. Humana Press, https://doi.org/10.1007/978-1-60327-101-1_2 (Year: 2008).*

(Continued)

*Primary Examiner* — Lut Wong
(74) *Attorney, Agent, or Firm* — Stephen J. Walder, Jr.; Jeffrey S. LaBaw

(57) ABSTRACT

Neural network protection mechanisms are provided. The neural network protection engine receives a pre-trained neural network computer model and forward propagates a dataset through layers of the pre-trained neural network computer model to compute, for each layer of the pre-trained neural network computer model, inputs and outputs of the layer. For at least one layer of the pre-trained neural network computer model, a differentially private distillation operation is performed on the inputs and outputs of the at least one layer to generate modified operational parameters of the at least one layer. The modified operational parameters of the at least one layer obfuscate aspects of an original training dataset used to train the pre-trained neural network computer model, present in original operational parameters of the at least one layer. The neural network protection engine generates a privatized trained neural network model based on the modified operational parameters.

20 Claims, 7 Drawing Sheets

(56) References Cited

U.S. PATENT DOCUMENTS

2019/0227980 A1* 7/2019 McMahan ............ G06K 9/6256
2020/0285980 A1* 9/2020 Sharad ................ G06F 21/6245

OTHER PUBLICATIONS

Abadi, Martin et al., "Deep Learning with Differential Privacy", Proceedings of the 2016 ACM SIGSAC Conference on Computer and Communications Security (CCS '16), Oct. 24-28, 2016, pp. 308-318, submitted version from arXiv: 1607.00133v2 [stat.ML], Oct. 24, 2016, 14 pages.
Fredrikson, Matt et al., "Model Inversion Attacks that Exploit Confidence Information and Basic Countermeasures", ACM Conference on Computer and Communications Security (CCS'15), Oct. 12-16, 2015, 12 pages.
Phan, Nhathai et al., "Differential Privacy Preservation for Deep Auto-Encoders: an Application of Human Behavior Prediction", Proceedings of the Thirtieth AAAI Conference on Artificial Intelligence (AAAI-16), Feb. 12-17, 2016, 8 pages.
Shokri, Reza, "Privacy-Preserving Deep Learning", ACM Conference on Computer and Communications Security (CCS'15), Oct. 12-16, 2015, 12 pages.
Tramer, Florian et al., "Stealing Machine Learning Models via Prediction APIs", 25th USENIX Security Symposium, Aug. 10-12, 2016, pp. 601-618.
Abadi, Martin et al., "Deep Learning with Differential Privacy", Proceedings of the 2016 ACM SIGSAC Conference on Computerand Communications Security (CCS '16), Oct. 24-28, 2016, 11 pages.
Ateniese, Giuseppe et al., "Hacking Smart Machines with Smarter Ones: How to Extract Meaningful Data from Machine Learning Classifiers", Int. J. Secur. Netw., 10(3), Sep. 2015, submitted version arXIV:1306.4447v1 [cs.CR] Jun. 19, 2013, 30 pages.
Ba, Lei J. et al., "Do Deep Nets Really Need to be Deep?", Advances in Neural Information Processing Systems 27 (NIPS 2014), Dec. 8-13, 2014, 9 pages.
Bucila, Cristian et al., "Model Compression", In Proceedings of the 12th ACM SIGKDD international conference on Knowledge discovery and data mining (KDD'06), Aug. 20-23, 2006, 7 pages.
Chanyaswad, Thee et al., "Coupling Random Orthonormal Projection with Gaussian Generative Model for Non-Interactive Private Data Release", arXiv:1709.00054v2 [cs.CR], Feb. 12, 2018, 17 pages.
Chaudhuri, Kamalika et al., "Privacy-preserving logistic regression", Proceedings of the 21st International Conference on Neural Information Processing Systems (NIPS'08), Dec. 2008, 8 pages.
Dwork, Cynthia et al., "Boosting and Differential Privacy", 2010 IEEE 51st Annual Symposium on Foundations of Computer Science, Oct. 24-26, 2010, 10 pages.
Dwork, Cynthia et al., "Calibrating Noise to Sensitivity in Private Data Analysis", Proceedings of the Third Conference on Theory of Cryptography (TCC'06), Mar. 4-7, 2006, 20 pages.
Dwork, Cynthia, "Differential Privacy", Automata, Languages and Programming, 33rd International Colloquium (ICALP 2006), Proceedings, Part II, Jul. 10-14, 2006, 12 pages.
Dwork, Cynthia et al., "Our Data, Ourselves: Privacy Via Distributed Noise Generation", Proceedings of the 24th Annual International Conference on The Theory and Applications of Cryptographic Techniques (EUOROCRYPT'06), May 28-Jun. 1, 2006, 18 pages.
Dwork, Cynthia et al., "The Algorithmic Foundations of Differential Privacy", Foundations and Trends in Theoretical Computer Science, vol. 9, Nos. 3-4, Aug. 11, 2014, 281 pages.
Ganju, Karan et al., "Property Inference Attacks on Fully Connected Neural Networks using Permutation Invariant Representations", Proceedings of the 2018 ACM SIGSAC Conference on Computer and Communications Security (CCS'18), Oct. 15-19, 2018, 15 pages.
Hinton, Geoffrey et al., "Distilling the Knowledge in a Neural Network", NIPS Deep Learning and Representation Learning Workshop, Dec. 12, 2014, submitted version arXiv:1503.02531v1 [stat.ML], Mar. 9, 2015, 9 pages.
Ioffe, Sergey et al., "Batch Normalization: Accelerating Deep Network Training by Reducing Internal Covariate Shift", arXIV:1502.03167v3 [cs.LG], Mar. 2, 2015, 11 pages.
Kingma, Diederik P. et al., "ADAM: A Method for Stochastic Optimization", arXiv:1412.6980v1 [cs.LG], Dec. 22, 2014, 9 pages.
Krizhevsky, Alex, "The CIFAR-10 dataset", Learning Multiple Layers of Features from Tiny Images, Apr. 8, 2009, 4 pages.
Lecun, Yann et al., "Deep learning", Nature, vol. 521, May 28, 2015, 10 pages.
Lecun, Yann et al., "Gradient-Based Learning Applied to Document Recognition", Proceedings of the IEEE, vol. 86, Issue 11, Nov. 1998, 46 pages.
Paszke, Adam et al., "Automatic differentiation in PyTorch", 31st Conference on Neural Information Processing Systems (NIPS 2017), Dec. 4-9, 2017, 4 pages.
Sheffet, OR, "Private Approximations of the 2nd-Moment Matrix Using Existing Techniques in Linear Regression", CoRR, submitted version arXiv:1507.00056v2 [cs.DS], Nov. 25, 2015, 31 pages.
Shokri, Reza et al., "Membership Inference Attacks Against Machine Learning Models", 2017 IEEE Symposium on Security and Privacy (SP), May 22-24, 2017, submitted version arXiv:1610.05820v2 [cs.CR], Mar. 31, 2017, 16 pages.
Song, Congzheng et al., "Machine Learning Models that Remember Too Much", Proceedings of the 2017 ACM SIGSAC Conference on Computer and Communications Security (CCS'17), Oct. 30-Nov. 3, 2017, 15 pages.
Zhang, Chiyuan et al., "Understanding Deep Learning Requires Rethinking Generalization", arXiv:1611.03530v1 [cs.LG], Nov. 10, 2016, 14 pages.

* cited by examiner

Algorithm 1 Differentially Private Ridge Regression

Require: Data matrix $D \in R^{n \times d}$ and a bound $B > 0$ on the $l_2$ - norm of any row in $D$.
 Privacy Parameters: $\varepsilon, \delta > 0$.
 Parameter $r$ indicating the number of rows in the resulting matrix.
1: Set $w$ such that $w^2 = \frac{4B^2}{\varepsilon}\left(\sqrt{2r \ln\left(\frac{4}{\delta}\right)} + \ln\left(\frac{4}{\delta}\right)\right)$
2: Set $\hat{D}$ as the concatenation of $D$ with $wI_{d \times d}$
3: Sample a $r \times (n + d)$ - matrix $R$ whose entries are i.i.d samples from a normal Gaussian $N(0,1)$
4: Return $M = \frac{1}{r}(R\hat{D})^T(R\hat{D})$ and the approximation of the regression weights $\tilde{\beta} = \arg\min_{\beta_d = -1} \beta^T M \beta$.

FIG. 1

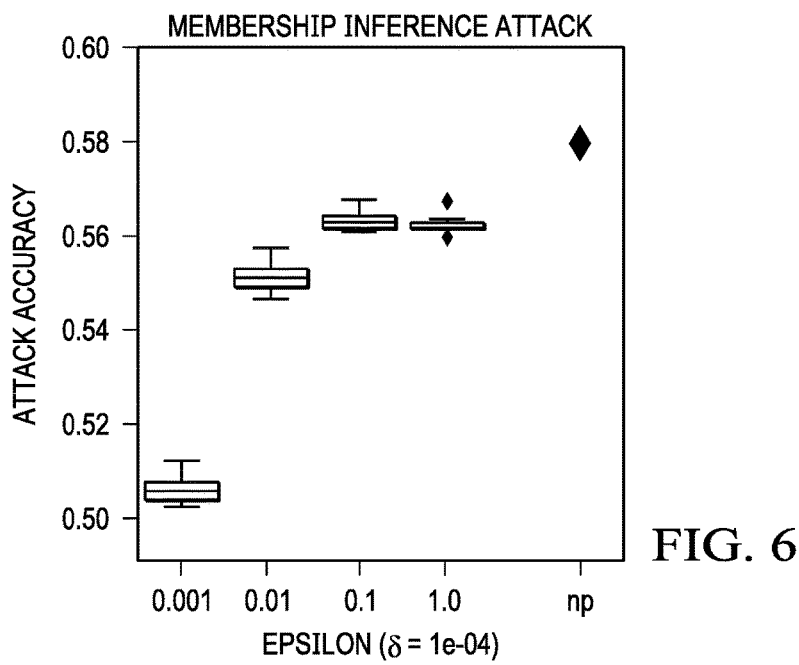

FIG. 6

LAYER-WISE DISTILLATION FOR PROTECTING PRE-TRAINED NEURAL NETWORK MODELS

BACKGROUND

The present application relates generally to an improved data processing apparatus and method and more specifically to mechanisms for protecting private data used to train a neural network model, e.g., a deep learning neural network, in order to allow secure deployment of the neural network model, where this protection is achieved through a layer-wise distillation operation that obfuscates the original training data used to train the deep learning model.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, labeled and unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions executed by the processor to specifically configure the processor to implement a neural network protection engine. The method comprises receiving, by the neural network protection engine, a pre-trained neural network computer model. The method further comprises processing, by the neural network protection engine, a dataset through layers of the pre-trained neural network computer model to compute, for each layer of the pre-trained neural network computer model, inputs and outputs of the layer. Moreover, the method comprises, at each layer of the pre-trained neural network computer model, performing a differentially private distillation operation on the inputs and outputs of the layer to generate modified operational parameters of the layer, wherein the modified operational parameters of the layer obfuscate aspects of an original training dataset used to train the pre-trained neural network computer model, present in original operational parameters of the layer. In addition, the method comprises generating, by the neural network protection engine, a first privatized trained neural network model based on the modified operational parameters.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example of an algorithm for performing differentially private regression in accordance with one illustrative embodiment;

FIG. 6 is an example plot of attack accuracy for a membership inference attack in accordance with one illustrative embodiment;

DETAILED DESCRIPTION

Figure 2:
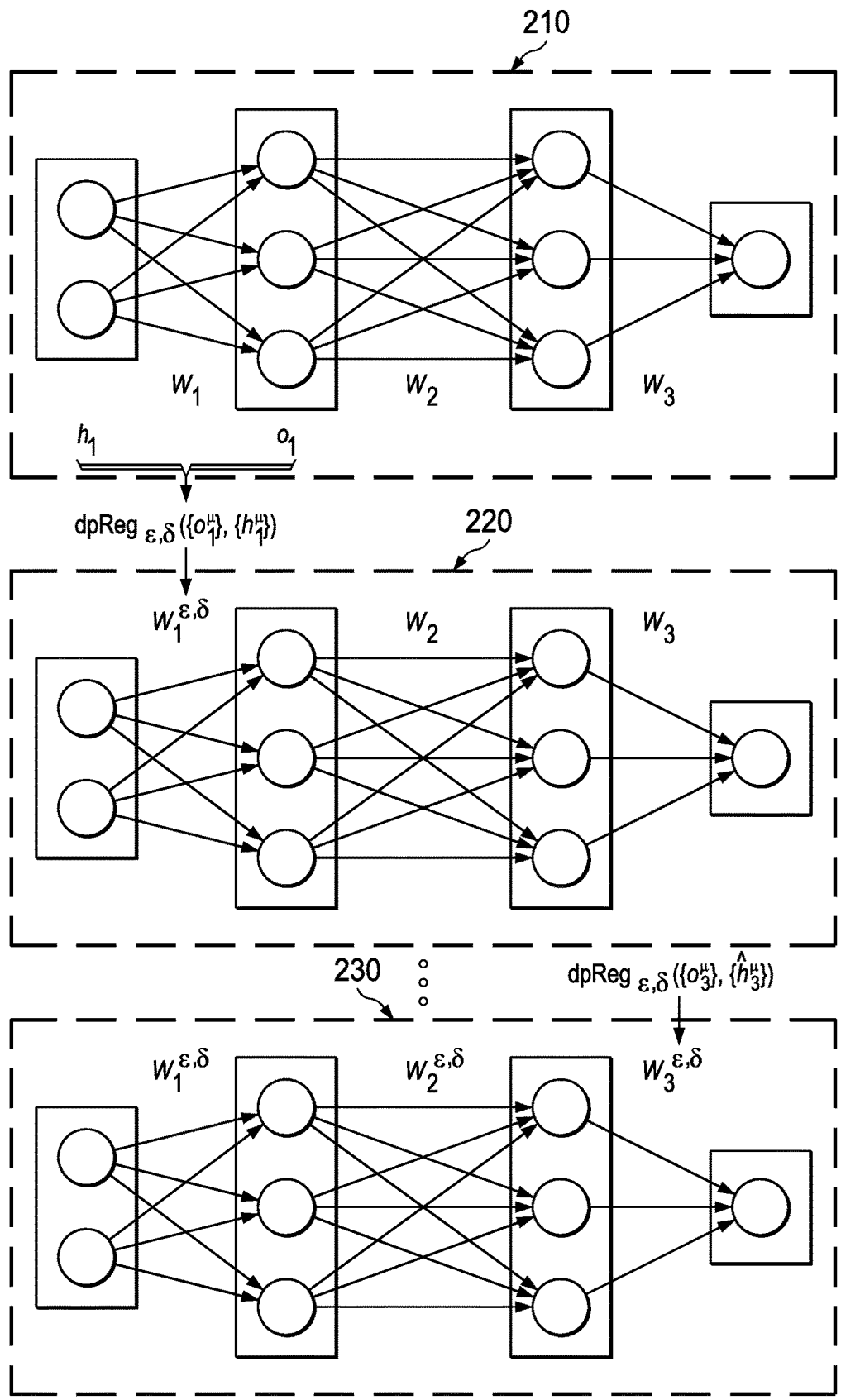
FIG. 2 is an example diagram illustrating an iterative procedure for performing differentially private model distillation on layers of a neural network model in accordance with one illustrative embodiment.

The illustrative embodiments provide mechanisms for protecting the training data used to train a neural network computing model, such as a deep learning neural networks (DNNs) or convolutional neural networks (CNNs) (collectively referred to herein as simply neural networks), machine learning systems employing such neural networks, cognitive systems employing such neural networks, and the like, by providing a mechanism for performing a layer-wise distillation operation to privatize, or sanitize, a pre-trained neural network model mechanism such that privacy of the training data used to train the neural network model, e.g., a DNN or CNN, is guaranteed. That is, the training data is not able to be discerned by inference attacks on the privatized, or sanitized, neural network generated as a result of the layer-wise distillation operation. Such inference attacks attempt to reverse engineer the training of the neural network model to identify private or sensitive training data used to train the neural network model, e.g., by evaluating whether a particular portion of data is present in the original training dataset or not, and the mechanisms of the illustrative embodiments privatize, or sanitize, the neural network model such that reverse engineering in this manner is not able to be performed. The mechanisms of the illustrative embodiments utilize a layer-wise differentially private distillation of pre-trained neural network models to privatize, or sanitize, the pre-trained neural network model prior to release of the trained neural network (hereafter assumed to be a deep learning neural network (DNN) for purposes of illustration) for use in processing runtime data, i.e. prior to deployment but after training of the neural network model.

It should be appreciated that the term "model" as it is used herein refers to a trained neural network executing or otherwise implemented by the hardware and software of a specifically configured computing device, such as in the case of a trained DNN or CNN, and may be used interchangeably with the term "neural network" herein. Moreover, the terms deep neural network, deep learning neural network, and neural network are all used interchangeably herein to reference a computer executed or implemented model that approximates a cognitive capability of a human being in a computing device that is specifically configured to implement the model.

Moreover, while the illustrative embodiments may be described with reference to example implementations using a context of image analysis and classification being performed by the trained DNN, CNN, or model, the illustrative embodiments and the present invention are not limited to such examples. Image analysis and classification is selected as an example due to recent popularity of face/image recognition application programming interfaces (APIs). Rather, the illustrative embodiments may be implemented with any trained DNN, CNN, or model performing analysis and/or classification with regard to any suitable input including, but not limited to, speech input, text input, image input, multimedia inputs, alphanumeric data, and the like, e.g., the trained DNN, CNN, or model may be implemented to perform speech and/or text recognition operations or any other operations of emulating cognitive approaches to generating insights and understanding of input data.

Neural network based systems, such as deep learning neural networks (DNNs) and convolutional neural networks (CNNs), are increasingly being used in a multitude of domains, e.g., computer vision, video games, audio, language processing, etc., for a variety of tasks. The remarkable success of deep learning originates from the availability of large amounts of relevant data that can be utilized to train neural network models, as the accuracy of a neural network model increases with an increase in the amount and quality of the data used to train the neural network model. The success of neural network based systems has resulted in many web services based on them. Service providers provide application program interfaces (APIs) to end users of the web services through which the end users may submit, via their client computing devices, input data to be processed by the web service, and are provided results data indicating the results of the operations of the web services on the input data.

Many times, cognitive systems utilize the neural networks to perform classification type operations to classify input data into various defined categories of information. For example, in an image processing web service, an input image comprising a plurality of data points, e.g., pixels, may be input to the web service which operates on the input image data to classify elements of the input image into types of objects present within the image, e.g., the image comprises a person, a car, a building, a dog, particular facial features of a face image, particular retinal features of a retina image, etc., to thereby perform object or image recognition. Similar types of classification analysis may be performed for various other types of input data, as mentioned above, including, but not limited to, speech recognition, natural language processing, audio recognition, social network filtering, machine translation, and bioinformatics. Such web services may provide functionality for analyzing and classifying input images for purposes of performing security based operations, e.g., verifying the identity of individuals, identifying suspicious activity, identify persons of interest, and the like.

While neural networks and the cognitive systems employing such neural networks have achieved remarkable performance on many recognition tasks, such as visual or image recognition tasks, recent research, such as described in Song et al., "Machine Learning Models that Remember Too Much," CCS 2017, has shown that these mechanisms can "memorize" information about the training dataset within the model itself, e.g., within the deep learning neural network (DNN). Moreover, recent research, such as described in Fredrikson et al., "Model Inversion Attacks that Exploit Confidence Information and Basic Countermeasures," CCS 2015, has shown that a model inversion attack can be used to recover such "memorized" sensitive information, e.g., images of the training data, from the trained DNN. For example, the model inversion attack can reconstruct faces in a training dataset by simply accessing the API of the trained DNN. Such model inversion attacks can therefore break the privacy of sensitive information, such as proprietary or protected training data.

This neural network memorization of aspects of the training dataset is especially problematic in that there is increasing commoditization and/or outsourcing of the training process of neural network models using a machine learning-as-a-service (MLaaS) paradigm. In such a paradigm, clients can upload their data to a MLaaS provider computing system together with a description of the specialized task that they wish their trained neural network model to perform, and the MLaaS will use the training data to train the neural network model to perform the requested task. The client may then use this trained model for their applications, offer them as a service via the query APIs, or share them with other partners.

As mentioned above, it should be noted that in training a neural network model, the effectiveness or accuracy of the neural network model is highly dependent on the quality of the training data used to train the neural network model and the closeness in resemblance of the training data to the actual data that the trained neural network model is expected to process during runtime. That is, if the runtime data is significantly different in nature from the training data used to train the neural network model, the accuracy of the results generated by the trained neural network may be relatively low. Thus, organizations have an incentive to utilize private or sensitive data to train neural networks to train such neural networks to be more accurate with the actual data they intend the trained neural network to process during runtime operation after deployment. However, as noted above, the trained neural network model may retain aspects of the training dataset in its parameters.

Thus, the parameters of the trained neural network model may leak information about the training dataset to such an extent that the trained neural network model can expose sensitive features in the data and even be used to faithfully reconstruct individual data records as noted in Song et al. and Fredrikson et al. mentioned above. This renders the release of trained neural network models for runtime use problematic, particularly in cases where the training data used to train the neural network is proprietary, contains sensitive information about the data owner, or is simply private in nature. That is, during training, the neural network tends to learn data features that are both related and also unrelated to the task the neural network is being trained to perform, and in some cases uses the parameters of the neural network model to memorize the training data. During deployment, done either through release of the trained neural network model or via access to specialized neural network model query APIs, inference attacks, such as model inversion attacks, model extraction and other attacks, may target the trained neural network model to reverse engineer or infer the training data and thereby access sensitive, proprietary, or private information.

For example, a model inversion attack on a neural network based face recognition system to recover face images in the training data was successfully demonstrated in Fredrikson et al., referenced above. An inversion attack was also used on a fully connected neural network to extract sensitive properties about the training data in Ganju et al., "Property Inference Attacks on Fully Connected Neural Networks Using Permutation Invariant Representations," Proceedings of the 2018 ACM SIGSAC Conference on Computer and Communications Security, CCS'18, 2018. As another example, the presence or absence of a particular data point in a training dataset was inferred using the attack outlined in Shokri et al., "Membership Inference Attacks Against Machine Learning Models," 2017 IEEE Symposium on Security and Privacy (SP), pp. 3-18, 2017. Moreover, Ateniese et al., "Hacking Smart Machines with Smarter Ones: How to Extract Meaningful Data from Machine Learning Classifiers," Int. J. Secur. Netw. 10(3), September 2015, describes an adversary that for a given target model architecture, used training datasets with or without a specific property to train multiple different classifiers. The individual classifiers were then used as feature vectors to train a meta-classifier and score the target model for the presence or absence of the statistical property in the training data. Alternately, for models that are deployed with only API access, extraction attacks are used to learn a close approximation of the model using minimum number of query responses as demonstrated in Tramer et al., "Stealing Machine Learning Models via Prediction APIs," Proceedings of the 25$^{th}$ USENIX Conference on Security Symposium, SEC'16, 2016.

Most attempted solutions to combat such attacks focus on the training process for training the neural network model and modify the training of the neural network model in some way to avoid disclosing sensitive, proprietary, or private information. That is, attempted solutions look to introduce noise into the training process itself based on a privacy budget and each iteration of the training accommodating the given privacy budget, i.e. accommodating a trade-off between privacy of the training data and accuracy of the output generated by the trained neural network model. As a result, once a neural network is trained using a modified training process in which noise is introduced to obfuscate the training data, if any modifications need to be made to the trained neural network, the neural network must be retrained. For example, if a developer of the trained neural network determines that a new level of privacy is needed for the trained neural network, the neural network must be completely retrained with a new noise introduction mechanism in order to achieve the desired level of privacy.

The illustrative embodiments provide an improved computing tool for privatizing, or sanitizing, a pre-trained neural network so as to make the resulting deployed neural network hardened against disclosing sensitive, private, or proprietary training data information when targeted by a model inference attack, such as a model inversion attack or the like. The privatization, or sanitizing, of the pre-trained neural network is accomplished by taking the pre-trained neural network model and transferring its parameters into a privatized model which guarantees differential privacy with respect to the data records used to train the original model. The privatized model can be safely publicly released while preserving differential privacy of the training dataset (differential privacy will be defined hereafter). The technique for transferring the parameters into the privatized model involves an iterative procedure that sequentially privatizes each layer of the pre-trained neural network by distilling its parameters through a differentially private distillation process. In other words, the illustrative embodiments determine the operational parameters, e.g., weights, associated with the nodes of each layer of the neural network model and introduce noise into the operational parameters that satisfies privacy differential requirements such that the original training data is not able to be discerned from the operational parameters of the layers, however the accuracy of the privatized or sanitized neural network model is related to privacy loss through a privacy constraint, i.e. the trade-off between accuracy of the output of the neural network model layers and the privacy loss upon release of the model can be tuned by a user via a privacy constraint parameter. The technique exploits the composability property of differential privacy, described hereafter, to provide overall privacy guarantees for the privatized model composed of differentially private distilled layers.

Thus, a layer-wise differentially private distillation of pre-trained deep neural network models is achieved which decouples model training from privatization. As a result, the mechanisms of the illustrative embodiments are agnostic to the pre-trained neural network model architecture and is agnostic as to the training algorithm utilized. This means that the mechanisms of the illustrative embodiments may be applied on any arbitrary pre-trained neural network model without requiring any knowledge about how it was trained, and used to derive differentially private versions of the original model with respect to the training data. Tests have shown that the illustrative embodiments are able to train a differentially private neural network with a modest privacy budget with minimal loss in accuracy. In particular, an illustrative embodiment has been demonstrated to privatize neural network models at a similar privacy budget as current state-of-the-art alternative privacy methods while maintaining a relatively higher final accuracy. The differentially private neural networks generated by way of the mechanisms of the illustrative embodiments are robust against inference attacks, such as membership inference attacks, i.e. attacks geared at determining whether a given data point was in the training dataset.

Before discussing the operation of the protection engine of the illustrative embodiments in greater detail, it is helpful to understand some underlying concepts employed by the mechanisms of the illustrative embodiments, such as differential privacy, composability, post-processing invariance, differentially private regression, and deep learning. Each of these concepts will now be described in order to provide a basis for understanding the improved computing tool and improvements to neural network training provided by the mechanisms of the illustrative embodiments.

Differential privacy (DP) is a rigorous mathematical framework providing privacy guarantees for algorithms executed on aggregate datasets. DP is described in a number of works including Dwork, "Differential Privacy," Automata, Languages and Programming, 33$^{rd}$ International Colloquium, ICALP 2006, Venice, Italy Jul. 10-14, 2006, Proceedings, Part II, pp. 1-12, 2006); Dwork et al., "The Algorithmic Foundations of Differential Privacy," Found. Trends Theor. Comput. Sci., 9, August 2014; and Dwork et al., "Our Data, Ourselves: Privacy via Distributed Noise Generation," Proceedings of the 24$^{th}$ Annual International Conference on the Theory and Applications of Cryptographic Techniques, EUROCRYPT'06, 2006. Informally, DP states that an adversary with access to the output of an algorithm will roughly learn the same information whether or not a specific datapoint is included or excluded from the dataset. For example, the output of an algorithm on two adjacent datasets, that differ only in a single entry, e.g., one image-label pair, is roughly the same, i.e. the presence or non-presence of the single entry does not appreciably affected the output of the algorithm.

Formally, ($\epsilon$, $\delta$)-DP is defined in the following manner, where $\epsilon$ is a parameter that quantifies the privacy loss (discussed hereafter), referred to as the privacy budget or privacy parameter, and $\delta$ is an upper bound on the probability that $\epsilon$-DP is invalid (see formal definition herein below). A randomized mechanism A: D→R with domain D and range R is said to satisfy ($\epsilon$, $\delta$)-differential privacy if for any two adjacent datasets D and D', differing in a single entry, and for any subset of outputs S ⊆ R, it holds that Pr[A(D)∈S]≤e$^\epsilon$Pr[A(D')∈S]+$\delta$, where $\epsilon$ is the privacy budget and Pr[e] indicates the probability of an event e. The smaller the value of $\epsilon$, the better the privacy, i.e. the lower the privacy loss. The additive term $\delta$ is interpreted as the probability with which $\epsilon$-DP can be broken (see Dwork et al., 2006 above). The values taken by $\delta$ are typically smaller than any polynomial in 1/|D|. The privacy guarantees are not affected by any side information available to the adversary.

To approximate a deterministic real-valued function f: D→R with a differentially private function, noise scaled to the sensitivity $S_f$ of f is added to the output. Sensitivity is defined as $S_f=\sup_{D,D'}\|f(D)-f(D')\|_1$ for any two adjacent datasets D and D'. Privacy mechanisms drawing noise from different distributions have been shown to achieve the privacy definition. For instance, the Laplace mechanism is defined as $$A(D) \triangleq f(D) + \text{Lap}\left(\frac{S_f}{\epsilon}\right)$$

where Lap(s) indicates a random variable distributed according to the Laplace distribution with zero mean and scale parameter s. Similarly, the Gaussian mechanism is defined by $A(D) \triangleq f(D)+N(0,S_f^2\cdot\sigma^2)$ where $N(0,S_f^2\cdot\sigma^2)$ is a random variable distributed according to the Gaussian distribution with zero mean and standard deviation $S_f\cdot\sigma$. Sensitivity for the Gaussian mechanism is defined using the $l_2$-norm as $S_f=\sup_{D,D'}\|f(D)-f(D')\|_2$ for any two adjacent datasets D, D'.

Composability is a property that allows repeated application of a noise mechanisms to a composition which allows for modular design of mechanisms. In other words, if all the components of a mechanism are differentially private, then they are also differentially private in their composition. In other words, if one has two algorithms whose outputs are differentially private, then the application of both algorithms simultaneously 9 which results in the composition of their outputs) is also differentially private (but with a higher privacy loss).

With regard to the concept of post-processing invariance, differential privacy is immune to post processing. That is, an adversary, without any additional knowledge about the dataset D, cannot compute a function on the output A(D) and make it less differentially private. Formally, for a deterministic function g: R→R' and any event S' ⊆ R' it holds that Pr[g(A(D))∈S']≤e$^\epsilon$Pr[g(A(D'))∈S']+$\delta$ for any two neighboring datasets D and D'.

Other notational conventions used herein are as follows. g: R→R' indicates that the function g takes inputs from a set R and gives back outputs in the set R'. With S' ⊆ R' what is meant is that the set S' is a subset of a set R'. With d∈S what is meant is that a variable d is in a set S. Thus, for example, if d is a random variable that can output 1, 2, 3, 4, 5 or 6 with equal probability, then d∈{1, 2, 3} is the event that the output of d is 1, 2 or 3, and Pr[d∈{1, 2, 3}]=0.5, because that probability is ½.

With regard to the concept of differentially private regression, let D∈$R^{n\times d}$ be a dataset of n (row) vectors of size d such that the $l_2$-norm of each row is bounded by a positive number B. D=[X; y] is treated as a concatenation of X∈$R^{n\times p}$ (which are n input vectors of size p) with a vector y∈$R^n$ of one label for each input, and where p=d−1. The goal is to predict y as a linear combination of the columns of the input data matrix X. Two input data matrices are neighbors if they different in a single row.

The well-known ridge regression problem can be formulated as finding $\beta=\text{argmin}_\beta\|X\beta-y\|^2+w^2\|\beta\|^2$ where the positive parameter w is a regularizer and has the role of penalizing solutions where b is too large. The closed form solution to this formulation is given by $(X^TX+w^2I_{p\times p})X^Ty$. Note the effect of w is to add noise to the $X^TX$ matrix and ensure that all the singular values are always greater than or equal to $w^2$. In Sheffet, "Private Approximations of the 2$^{nd}$-Moment Matrix Using Existing Techniques in Linear Regression," CoRR, abs/1507.00056, 2015, the Algorithm 1 shown in FIG. 1 is used to set w such that the regression model, i.e. the solution β to the regression problem, satisfies (ϵ, δ)-DP via the Johnson-Lindenstrauss transform.

With regard to the concept of deep learning, one of the reasons for the effectiveness of deep learning is its flexibility in defining neural network architectures that can be trained end-to-end on a task of interest. A neural network architecture defines functions from inputs to outputs as a composition of basic layers, such as linear modules and point-wise monotonic nonlinear functions like sigmoids and rectified linear units (ReLUs). Given a vector input $x \in \mathbb{R}^d$, the output of a deep neural network with K layers would then be a function F(x) typically parametrized by a set of weight matrices $\{W_k\}$ for $k=1, \ldots, K$ (without loss of generality, ignoring bias parameters) computed as:

$$h_{k+1} = f_k(o_k) \text{ and } o_k = W_k h_k \text{ for } k=1, \ldots K \quad (1)$$

with $h_1 = x$ and $F(x) = h_{K+1}$,
where $f_k$ are point-wise nonlinear functions. Given a training dataset $D_{train}$ consisting of a set of N input/output pairs $(x^\mu, y^\mu)$ for $\mu=1, \ldots, N$, one can then perform supervised learning by optimizing the parameters $\{W_k\}$, typically through gradient descent, to minimize a cost function L(F $(x^\mu), y^\mu$) averaged over μ, quantifying the mean discrepancy between $F(x^\mu)$ and $y^\mu$.

Because of the large number of operational parameters of deep learning neural networks, a technique to transfer the knowledge in large trained "teacher" neural network models to a simpler light-weight "student" neural network models has been devised. This can be done with a procedure that goes under the name of model compression or model distillation, which consists in computing the teacher's output for unlabeled samples, e.g., either new unlabeled data or the original training data, and then training the student model to reproduce the teacher's outputs. Examples of such mechanisms are described in Bucilu et al., "Model Compression," Proceedings of the 12th ACM SIGKDD International Conference on Knowledge Discovery and Data Mining, pp. 535-541, ACM, 2006 and Hinton et al., "Distilling the Knowledge in a Neural Network," NIPS Deep Learning and Representation Learning Workshop, 2014.

Having described these underlying concepts of differential privacy, composability, post-processing invariance, differentially private regression, and deep learning, it should be appreciated that these concepts are applied by the mechanisms of the illustrative embodiments in an iterative manner to each layer of a deep learning neural network model to learn the operational parameters of the individual layers, e.g., the weights provided in a weight matrix, and then introduce noise into the operational parameters to obfuscate the operational parameters generated through the training process and thereby obfuscate the trained deep learning neural network model's memorization of aspects of the original training dataset. Thus, the sanitized deep learning neural network model will have modified operational parameters for each of the layers of the sanitized model when compared to the originally trained deep learning neural network model. While these modified operational parameters obfuscate the memorized features of the original training dataset that were present in the trained deep learning neural network model, the modified operational parameters satisfy the differential privacy (DP) requirements and an acceptable privacy budget such that the operation of the sanitized model provides an acceptable level of accuracy compared to the original trained deep learning neural network model.

As a formal description of the mechanisms of the illustrative embodiments, given a K-layer neural network F(x) as in equation (1) above, trained on a dataset $D_{train}$, the protection engine operates to privatize the neural network such that the released neural network releases the weight parameters $\{W_k\}$ (k=1, ..., K) in such a way as to guarantee differential privacy of the individual data samples in the training dataset $D_{train}$. Within a differential privacy framework, the issue is how, in practice, to bound the sensitivity $S_{W_k} = \|W_k(D_{train}) - W_k(D'_{train})\|_2$ of the weight matrices $W_k$ seen as a function of the training data $D_{train}$. The difficulty is that $W_k$ also depends on the training algorithm, which makes computing $S_{W_k}$ difficult and dependent on the training procedure. It has been recognized, however, that this difficulty may be overcome by instead considering the weights $W_k$ of a linear layer in $o_k = W_k h_k$ of equation (1) above to be the result of distilling the linear function between the layer's inputs $h_k$ and its outputs $o_k$.

In particular, the weights $W_1$ are the solution of the least-squares problem $\min_{W_1} \Sigma_\mu \|o_1^\mu - W_1 x^\mu\|_2^2$, where the vectors $o_k^\mu$ are obtained from equation (1) above by forward propagating the inputs $x^\mu$ in $D_{train}$, through the trained neural network F(x). As mentioned above, such a least-squares problem can be solved by differential private regression, such as by using the algorithm described in FIG. 1. The resulting weights satisfy the (ϵ, δ)-differential privacy with respect to the regression data, i.e. the vectors $\{o_1^\mu\}$ and the training input data $\{x^\mu\}$. Herein, the (ϵ, δ)-differential private solution of regressing the vectors $\{o_1^\mu\}$ against the vectors $\{x^\mu\}$ for $\mu=1, \ldots, N$ is denoted as $W_1^{\epsilon,\delta} = dpReg_{\epsilon,\delta}(\{o_1^\mu\}, \{x^\mu\})$ This procedure can be iterated to obtain differentially private versions of the weights $W_k$ for k>1 by propagating forward the inputs $\{x^\mu\}$ through the neural network model that has been privatized until weights $W_{k-1}^{\epsilon,\delta}$ to obtain the pre-activations of the k-th linear layer $h_k^\mu$ and use those to compute $W_k^{\epsilon,\delta} = dpReg_{\epsilon,\delta}(\{o_k^\mu\}, \{h_k^\mu\})$, recalling that $\{o_k^\mu\}$ are computed by forward propagating the training inputs through the original neural network model. This iterative procedure is represented in FIG. 2. FIG. 2 shows a differentially private model distillation process applied to a K-layer neural network, where K=3 in the depicted example. In operation 210, the (ϵ, δ)-differentially private copy $W_1^{\epsilon,\delta}$ of weights $W_1$ is computed using differential private regression, e.g., algorithm 1 in FIG. 1, from the activations obtained by forward propagating the inputs $h_1 = x^\mu$ through the neural network model. In operations 220 and 230, this procedure is iterated sequentially along the neural network model architecture to obtain the (ϵ, δ)-differentially private version of all the weights.

Thereafter, as mentioned above, composability may be invoked to guarantee that the set of differentially private weight matrices $\{W_k^{\epsilon,\delta}\}$ satisfies (Kϵ, Kδ)-differential privacy with respect to $D_{train}$. In other words, the composition theorems of differential privacy that state that if composing multiple mechanisms, such as mechanisms K, that are (ϵ, δ)-differential private, then the composed mechanism will be at least (K*ϵ, K*δ)-differential private. The illustrative embodiments exploit composability to prove that if individual layers are privatized such that they are individually (ϵ, δ)-differential private, then the whole composed K-layer architecture will be (K*ϵ, K*δ)-differential private.

Weights $W_1^{\epsilon,\delta} = dpReg_{\epsilon,\delta}(\{o_k^\mu\}, \{x^\mu\})$ satisfy (ϵ, δ)-differentially privacy with respect to $D_{train}$ due to the privacy guarantees of Algorithm 1 of FIG. 1. The weights $W_k^{\epsilon,\delta} = dpReg_{\epsilon,\delta}(\{o_k^\mu\}, \{h_k^\mu\})$ access information about $D_{train}$ through $\{h_k^\mu\}$ and the activations of the original neural network model $\{o_k^\mu\}$. The activations $\{h_k^\mu\}$ in turn access $D_{train}$ through already privatized weights $W_1^{\epsilon,\delta} \ldots W_{k-1}^{\epsilon,\delta}$. Because of post-processing invariance, the weights do not leak more information than $(\epsilon, \delta)$-differentially private access to $D_{train}$. Weights $W_k^{\epsilon,\delta}$ therefore also satisfy $(\epsilon, \delta)$-differentially privacy with respect to $D_{train}$ due to the privacy guarantees of algorithm 1 in FIG. 1. Hence, all weights $W_k^{\epsilon,\delta}$ are individually $(\epsilon, \delta)$-differentially private with respect to $D_{train}$. Because of composability, the set of weights $\{W_k^{\epsilon,\delta}\}$ for $k=1, \ldots, K$ is $(K\epsilon, K\delta)$-differentially private with respect to $D_{train}$.

It should be appreciated that the illustrative embodiments use the concept of distillation in deep learning to access the function of the layer without directly accessing the weights themselves. Knowing the function of the layer (the input-output relation that it implements) allows the mechanisms of the illustrative embodiments to privatize this function, which implicitly provides a privatization of the parameters. This connection between distillation and privatization is an improved feature of the illustrative embodiments. The functionality that this enables, i.e. being able to privatize pre-trained models is a further improved feature of the illustrative embodiments not previously recognized in any known mechanisms.

Thus, the mechanisms of the illustrative embodiments improve the operation of the neural network, and the machine learning or cognitive system implementing the neural network, by adding additional non-generic functionality that previously did not exist in the neural network mechanism or machine learning or cognitive system, specifically for protecting against model inference attacks, e.g., model inversion attacks and other attacks aimed at identifying private, sensitive, or proprietary data in the original training dataset used to train the deep learning neural network model. The mechanisms of the illustrative embodiments add additional technological logic in the neural network and machine learning or cognitive system that specifically implements a sanitization engine that sanitizes the pre-trained deep learning neural network model using a layer-wise differentially private distillation operation that obfuscates the memorized aspects of the original training dataset present in the pre-trained deep learning neural network model while maintaining accuracy of the operation of the sanitized neural network model with regard to a privatization budget. As a result, an attacker may attempt to reverse engineer the training dataset used to train the sanitized deep learning neural network model but will be unable to obtain the actual private, sensitive, or proprietary training data actually used to train the deep learning neural network model.

The mechanisms of the illustrative embodiments are specific to a technological environment involving one or more data processing systems and/or computing devices that are specifically configured to implement the additional logic of the present invention, e.g., the protection engine, thereby resulting in a non-generic technological environment comprising one or more non-generic data processing systems and/or computing devices. Moreover, the illustrative embodiments are specifically directed to solving the technological problem of model inference attacks on computer implemented deep learning neural network models, such as DNNs, CNNs, and the like, by providing a protection engine that specifically operates on the pre-trained computer implemented deep learning neural network models to obfuscate the aspects or features of the original training dataset memorized by the trained deep learning neural network model through a layer-wise distillation process. This requires a specifically configured computing device or system that operates on computer implemented neural network models, machine learning models, deep learning models, or other such artificial intelligence or cognitive operation based computing mechanisms.

Before providing a discussion of various aspects of the computing environments and elements of the protection engine of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for privatizing, or sanitizing, an already trained, or pre-trained, deep learning neural network model so that it does not leak information about the original training dataset which may include sensitive, private, or otherwise proprietary information. The mechanisms of the present invention do not require a modification of the training operation itself nor any specific knowledge about the neural network model or its training procedure, i.e. the present invention is agnostic to the training procedure and specific neural network model. The mechanisms of the present invention determine the operational parameters of the layers of the neural network model through a layer-wise distillation process and then obfuscate the operational parameters through a specific noise introduction algorithm that obfuscates the learned aspects or features of the original training dataset. This is done to the already trained deep learning neural network and thus, can be applied to a plethora of different types of trained deep learning neural networks. Moreover, the present invention may be applied to generate different versions of privacy enhanced trained deep learning neural networks by modifying the privacy budget aspects of the present invention to achieve different levels of privacy enhancement of the resulting sanitized deep learning neural networks. Thus, if a user wishes to have a different level of privacy with regard to their trained deep learning neural network, this different level of privatized deep learning neural network may be achieved without having to re-train the deep learning neural network.

Figure 3:
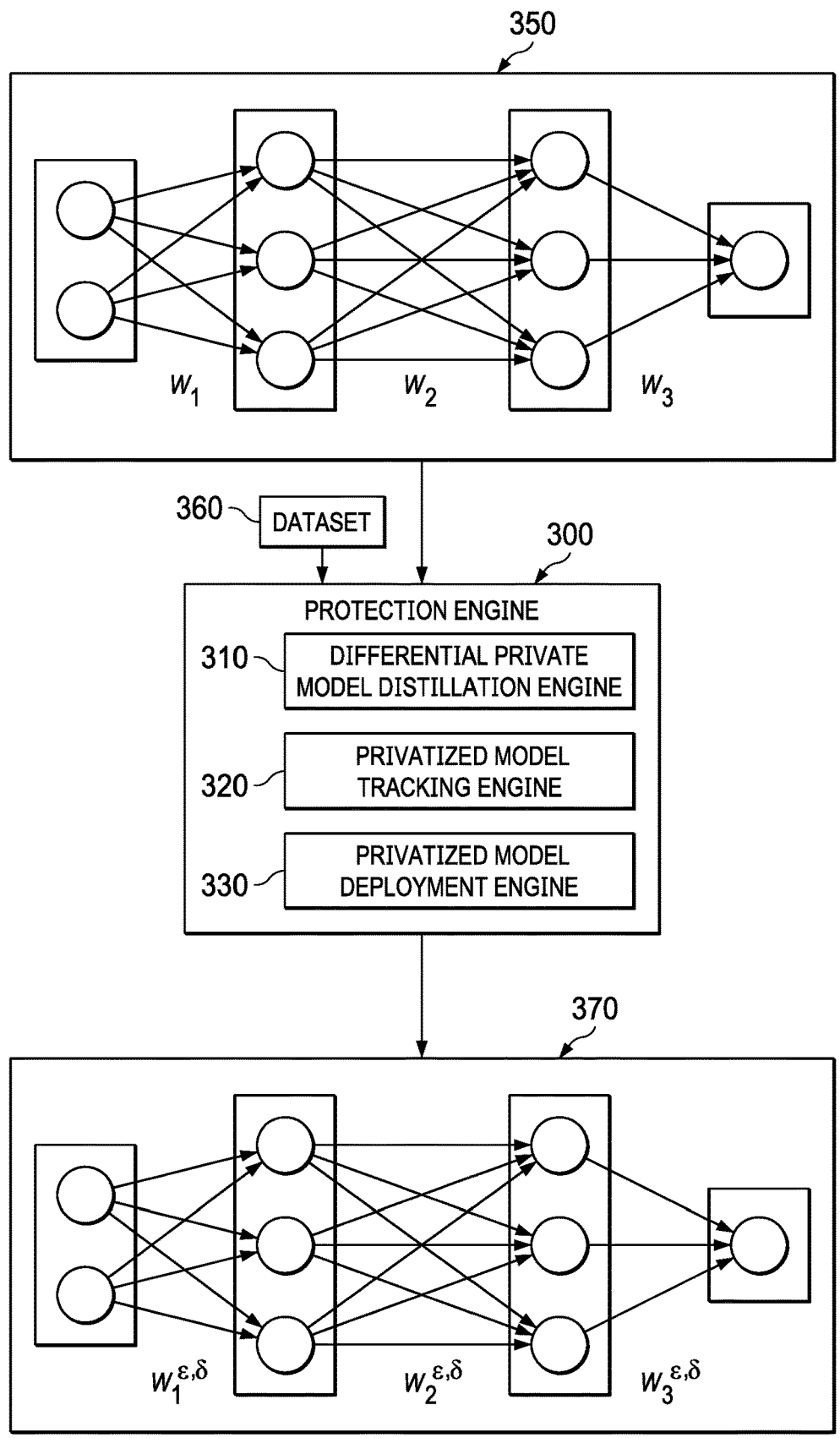
FIG. 3 is an example block diagram illustrating the primary operational elements of a protection engine in accordance with one illustrative embodiment.

FIG. 3 is an example block diagram illustrating the primary operational elements of a protection engine in accordance with one illustrative embodiment. As shown in FIG. 3, the protection engine 300 of the illustrative embodiments comprises a differential private model distillation engine 310, a privatized model tracking engine 320, and a privatized model deployment engine 330. It should be appreciated that the terms "protected", "privatized", and "sanitized" are used interchangeably herein to reference the fact that the present invention removes the aspects of training data embedded in the operational parameters of the neural network model due to the training of the neural network model so that the neural network model is hardened against attacks that would attempt to reverse engineer the training data from the operational parameters of the neural network layers.

The protection engine 300 of the illustrative embodiments receives a pre-trained deep learning neural network model 350 and a dataset 360, e.g., the original training dataset or another dataset for processing by the pre-trained neural network model, which is then processed by the differential private model distillation engine 310 by performing forward propagation of the received dataset 360 data through the layers of the pre-trained deep learning neural network model 350 and computing the resulting inputs and outputs at each parameterized layer of the pre-trained deep learning neural network 350. The differential private model distillation engine 310 distills the parameters, e.g., weights, of the layers of the pre-trained neural network by considering each layer as a linear function between the layer's inputs and its outputs and performing a differential private regression on each layer. This distillation is performed iteratively along the neural network layers so as to identify operational parameters, e.g., weights, for each layer of the neural network and distill them to modified differentially private operational parameters, such as by using the differentially private regression algorithm outlined in FIG. 1.

For example, with reference again to FIG. 2, the dataset 360 may be forward propagated through an initial layer of the pre-trained deep learning neural network to compute the resulting inputs and outputs of this parameterized linear layer. Assuming a linear function relationship between the inputs and outputs, the operational parameters of the layer may be determined based on the inputs and outputs, e.g., the weight matrix $W_1$ for the first layer of the pre-trained deep learning neural network model may be devised from the inputs $h_1$ and the outputs $o_1$ of the first layer generated by the forward propagation of the dataset 360. The differential private model distillation engine 310 may then perform a layer-wise distillation operation, such as by executing the differentially private regression algorithm of FIG. 1, to replace the linear layer resulting operational parameters, e.g., weight matrix $W_1$, with the result of a differential private regression operation (denoted $dpReg_{\epsilon,\delta}(\{o_k^\mu\}, \{h_1^\mu\})$ in FIG. 2), such as by applying the algorithm of FIG. 1, for example, on the inputs $h_1$ and outputs $o_1$.

The resulting differentially private distilled or sanitized operation parameters, e.g., weights $W_1^{\epsilon,\delta}$, are then provided as replacements for the original operational parameters in the sanitized deep learning neural network model. This process is iteratively performed, such as shown in FIG. 2, with each subsequent layer of the pre-trained deep learning neural network so as to modify the operational parameters of each layer using a differentially private distillation operation that obfuscates the original operational parameters and thus, the memorized aspects or learned features of the original training dataset. In essence, the differentially private regression operation introduces noise into the trained operational parameters of the pre-trained deep learning neural network model on a layer by layer basis so as to obfuscate the original operational parameters of the trained deep learning neural network but does so while maintaining differential privacy and a specified privacy budget. The resulting privatized, or sanitized, deep learning neural network model will remain accurate in its operation as the differential privacy constraints are satisfied, however the training dataset features memorized by the trained (and now sanitized) deep learning neural network model are obfuscated.

The privatized model tracking engine 320 tracks the modifications to the operational parameters generated by the layer-wise differentially private distillation operation so as to compose the operational parameters for defining a sanitized or privatized deep learning neural network model. The operational parameter data structures, e.g., the data structures specifying the weights $W_1^{\epsilon,\delta}$ of the sanitized deep learning neural network model, define the operational parameters for the sanitized or privatized model which may be used to configure the sanitized or privatized deep learning neural network model that is deployed by the privatized model deployment engine 330 for use in processing runtime data. For example, the privatized model deployment engine 330 may provide the sanitized or privatized model 370 back to the original source of the pre-trained deep learning neural network model, provide the sanitized model for access by corresponding APIs, or otherwise provide the sanitized model 370 for deployment. For example, in one illustrative embodiment, the sanitized or privatized model 370 may be deployed to a cognitive computing system for implementation as part of the cognitive computing system, or otherwise accessible by the cognitive computing system via one or more APIs, to perform cognitive computing operations. It should be appreciated that the deployed sanitized model 370 provides an acceptable level of accuracy of operation corresponding to the original pre-trained deep learning neural network model while improving the privacy of the training dataset through the layer-wise differentially private distillation process performed. Thus, information leakage by the deployed sanitized model 370 is minimized as a result of the distillation process of the illustrative embodiments.

The privacy improvements achieved through the mechanisms of the illustrative embodiments, along with the accuracy of the resulting sanitized deep learning neural network models has been confirmed through experimental results obtained from two types of deep learning architectures, i.e. fully connected feed-forward neural networks and convolutional neural network models trained on standard MNIST and CIFAR-10 datasets, respectively. The MNIST dataset consists of 28×28 gray-level images depicting handwritten digits partitioned into 60,000 training samples and 10,000 testing samples that have to be classified as one of 10 digits. A fully connected 2-hidden layer neural network with 200 hidden neurons and ReLU activations using Adam-SGD was trained achieving 99.995% training and 98.33% test accuracy. Next the differentially private model distillation technique of the illustrative embodiments was applied to obtain a ($\epsilon$, $\delta$)-differentially private neural network (sanitized neural network) with respect to the training dataset. For each layer, the algorithm in FIG. 1 is applied, with $\epsilon/K$ and r=12, where K=3 is the number of layers, on the activations obtained by forward propagating the training dataset.

In order to maintain differential privacy, the inputs were transformed by applying a Gaussian random projection, and subsequently normalizing them. In practice, this corresponds to altering the privatized architecture by adding a random projection and a normalization operation, and then proceeding with the layer-wise privatization techniques of the illustrative embodiments. The random projection is random and independent from the training data and therefore, does not have any impact on the privacy guarantees.

Figure 4:
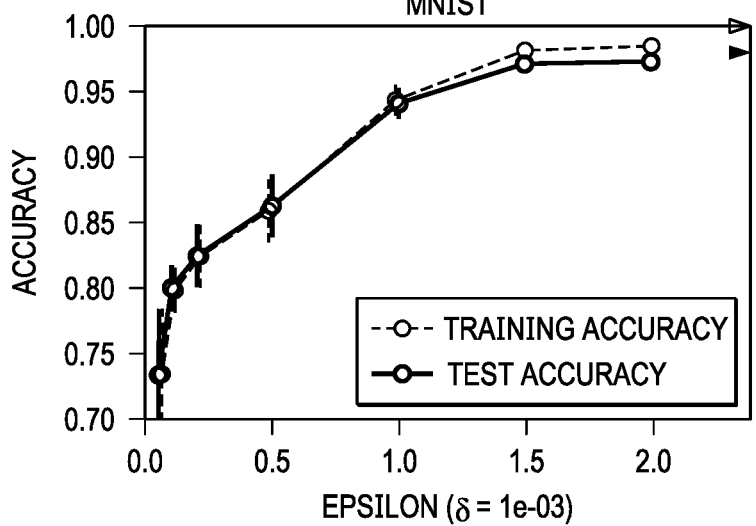
FIG. 4 is an example plot of performance of a privatized fully connected ReLU 2-hidden layer neural network in accordance with one illustrative embodiment.

As shown in FIG. 4, when plotting the test accuracy of the resulting privatized (sanitized) neural network model as a function of $\epsilon$ for $\delta$ set to 0.001, it was determined that the test accuracy is remarkably close to the performance of the original pre-trained deep learning neural network model for $\epsilon$ just above 1.0 and remains above 90% for a considerable range below $\epsilon$=1.0. Thus, the plot shown in FIG. 4 illustrates that model accuracy similar to that of the original pre-trained deep learning neural network model is achieved even after the layer-wise differentially private distillation operations of the illustrative embodiments are applied to sanitize the pre-trained deep learning neural network models to reduce information leakage with regard to the training dataset.

Figure 5:
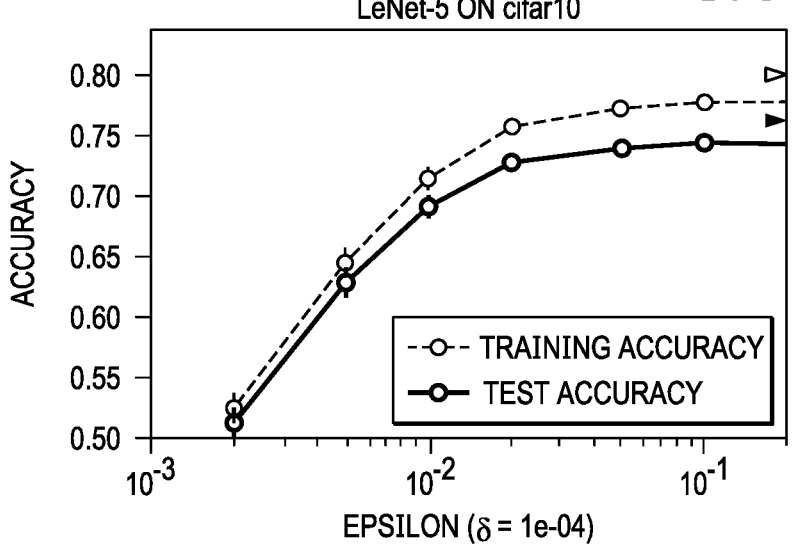
FIG. 5 is an example plot of performance of a privatized LeNet-5 convolutional architecture trained on a CIFAR-10 dataset in accordance with one illustrative embodiment.

Similarly, FIG. 5 shows an example plot of the test accuracy of the resulting privatized (sanitized) neural network model as a function of $\epsilon$ for $\delta$ set to 0.0001 for a CIFAR-10 dataset trained neural network model. The CIFAR-10 dataset consists of small color images that have to be classified into 10 classes and partitioned into 50,000 training samples and 10,000 test samples. A variation of a standard convolutional neural network was used on the task, referred to as the LeNet-5 architecture consisting of 2 convolutional layers followed by 3 fully-connected layers. The resulting trained model achieves a training accuracy of 80.13% and a test accuracy of 76.01%. Privatization of the convolutional layers is obtained by reformatting convolutional filters and their inputs with the lowering (im2col) operation and then proceeding as for the standard affine layers. Remarkably, for $\epsilon$ as low as 0.1 and $\delta$=0.0001, a relative loss in performance is achieved that is less than 2% of the original performance of the original pre-trained deep learning neural network model.

FIG. 6 shows is an example plot of attack accuracy for a membership inference attack in accordance with one illustrative embodiment. A membership inference attack is aimed at determining if a specific data point was part of the training dataset. It is designed to violate the privacy of individual users whose data are used for model training. An attacker begins by training multiple shadow models using data that is distributed similar to the target model's training data. Training stops when the shadow model achieves performance similar to that of the target model. At this point, all records in the training dataset of a shadow model are used to query the model and the output vectors are labeled "in". The shadow model is also queried using a test dataset, disjoint from the training dataset, and the output vectors are labeled "out." This is repeated for every shadow model and the generated labeled data (with "in", "out" labels) are used to train an attack model, which given the output vector of the target model can classify if the corresponding input was a member of the training data or not. It is helpful if the structure and training algorithm of the shadow models is the same as for that of the target model.

For the evaluation shown in FIG. 6, the membership inference attack was evaluated on the LeNet-5 using the CIFAR-10 dataset. 50 shadow LeNet-5 models were trained and the attack model was trained as a set of 10 2-layer networks (one network per class). The hidden layers had 500 neurons and the training was performed for 10 epochs with an Adam-SGD training process. During training, 1000 samples were removed at random from the CIFAR-10 training dataset and labeled "out", with the remaining data being used to train a shadow model. Once trained, 1000 samples were randomly selected from the training data (disjoint from the "out" samples) and labeled "in." This was done for all the shadow models to generate the training data for the attack model.

The attack accuracy on the original pre-trained deep learning neural network model as well as the privatized (sanitized) models is shown in FIG. 6. As shown in FIG. 6, for a fixed value of $\delta$=0.0001, a decrease in values of $\epsilon$ increases the resilience of the privatized model against membership attack. At $\epsilon$=0.001, the attack accuracy reduced to that of a random guess. This clearly reflects the effectiveness of the layer-wise differential private distillation mechanism of the illustrative embodiments against membership inference attacks.

Figure 7:
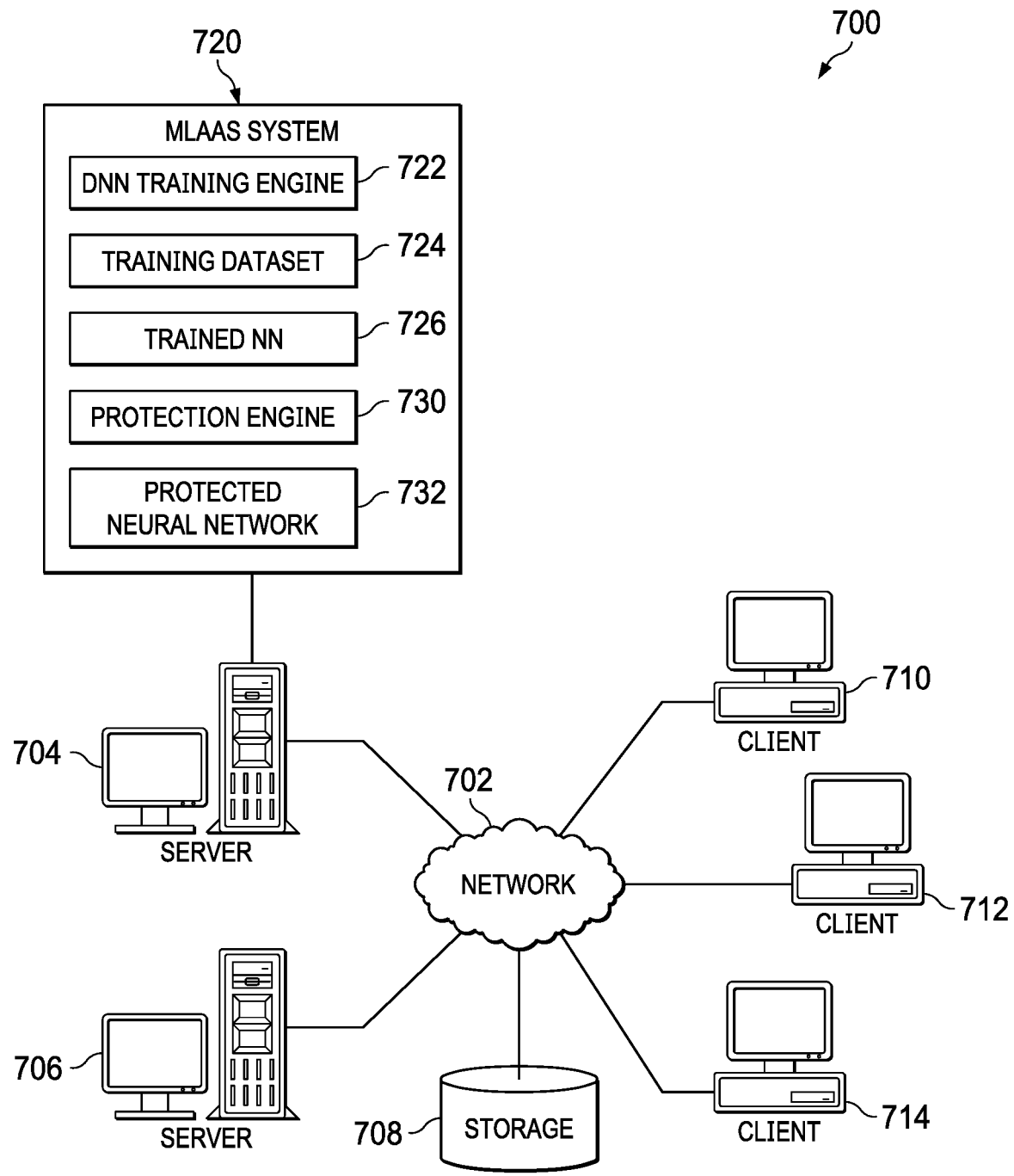
FIG. 7 is an example diagram of a distributed data processing system environment in which a protection engine is provided as part of a machine learning as a service mechanism in accordance with one illustrative embodiment.

FIG. 7 is an example diagram of a distributed data processing system environment in which a protection engine is provided as part of a machine learning as a service (MLaaS) mechanism in accordance with one illustrative embodiment. With a MLaaS implementation, an end user may enlist the MLaaS mechanisms provided by via one or more server computing systems, to train a deep learning neural network model to perform a specified task. The MLaaS mechanisms may train the model using training data provided by the end user, and then provide access the trained model via one or more APIs so that the trained model may be applied to new runtime data. As part of this process, the mechanisms of the illustrative embodiments may be employed to sanitize the trained model prior to making the trained model available for access via the APIs.

In other illustrative embodiments, the mechanisms of the illustrative embodiments may receive a pre-trained deep learning neural network model and may perform sanitization using the layer-wise differentially private distillation mechanisms of the protection engine of the illustrative embodiments. In addition, the end user may provide a training dataset or other dataset upon which the pre-trained deep learning neural network is to operate as part of the forward propagating operation of the mechanisms of the illustrative embodiments so as to distill and obfuscate the operational parameters of the layers of the pre-trained deep learning neural network model, as described previously. Thus, in some illustrative embodiments, the protection engine mechanisms of the illustrative embodiments may be part of a MLaaS system or may be separate from such a MLaaS system but provided as a service in its own right to assist end users in sanitizing their trained deep learning neural network models prior to deployment.

It should be appreciated that while FIG. 7 depicts a MLaaS implementation of the protection engine mechanisms of the illustrative embodiments, the illustrative embodiments are not limited to such. Rather, in some implementations, the protection engine mechanisms of the illustrative embodiments may be provided to end user data processing systems for implementation such that the end users may sanitize their own models prior to any exposure of the model outside the end user's own data processing systems. For example, a server computing device may provided the protection engine to an authorized end user computing environment, such as in response to a request from an end user, for execution within the private computing environment of the end user. Any other implementation that permits sanitization of a pre-trained deep learning neural network model in accordance with the layer-wise differentially private distillation mechanisms of the illustrative embodiments may be used without departing from the spirit and scope of the present invention.

FIG. 7 depicts a pictorial representation of an example distributed data processing system in which aspects of the illustrative embodiments may be implemented. Distributed data processing system 700 may include a network of computers in which aspects of the illustrative embodiments may be implemented. The distributed data processing system 700 contains at least one network 702, which is the medium used to provide communication links between various devices and computers connected together within distributed data processing system 700. The network 702 may include connections, such as wire, wireless communication links, or fiber optic cables.

In the depicted example, server 704 and server 706 are connected to network 702 along with storage unit 708. In addition, clients 710, 712, and 714 are also connected to network 702. These clients 710, 712, and 714 may be, for example, personal computers, network computers, or the like. In the depicted example, server 704 provides data, such as boot files, operating system images, and applications to the clients 710, 712, and 714. Clients 710, 712, and 714 are clients to server 704 in the depicted example. Distributed data processing system 700 may include additional servers, clients, and other devices not shown.

In the depicted example, distributed data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 700 may also be implemented to include a number of different types of networks, such as for example, an intranet, a local area network (LAN), a wide area network (WAN), or the like. As stated above, FIG. 7 is intended as an example, not as an architectural limitation for different embodiments of the present invention, and therefore, the particular elements shown in FIG. 7 should not be considered limiting with regard to the environments in which the illustrative embodiments of the present invention may be implemented.

As shown in FIG. 7, one or more of the computing devices, e.g., server 704, may be specifically configured to implement a MLaaS system 720 which includes deep learning neural network training engine 722 and a protection engine 730 in accordance with one or more of the illustrative embodiments. The deep learning neural network training engine 722 may take a training dataset 724 and train a deep learning neural network model 726 to perform a desired task in a manner generally known in the art. The protection engine 730 operates to sanitize the trained neural network, such as a deep learning neural network model 726 generated by the deep learning neural network training engine 722 of the MLaaS system 720. The protection engine 730 comprises the mechanisms as shown in FIG. 3 whose operation is as described above to apply a layer-wise differentially private distillation operation to the layers of the trained deep learning neural network model 726 to thereby sanitize the operational parameters of the layers of the trained deep learning neural network so that they do not leak information about the original training dataset 724 used to train the deep learning neural network model 726. The MLaaS system 720 may then deploy the sanitized deep learning neural network model 732 for runtime use or for implementation at the end user computing environment. In some illustrative embodiments, the MLaaS system 720 may deploy the sanitized, or protected, neural network model 732, e.g., a sanitized/ protected deep learning neural network, by making the model 732 accessible via one or more APIs by end users, such as users of client computing devices 710-714.

It should be appreciated that the configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates privatizing trained deep learning neural network models so that they do not leak private, sensitive, or proprietary data present in their training datasets.

Figure 8:
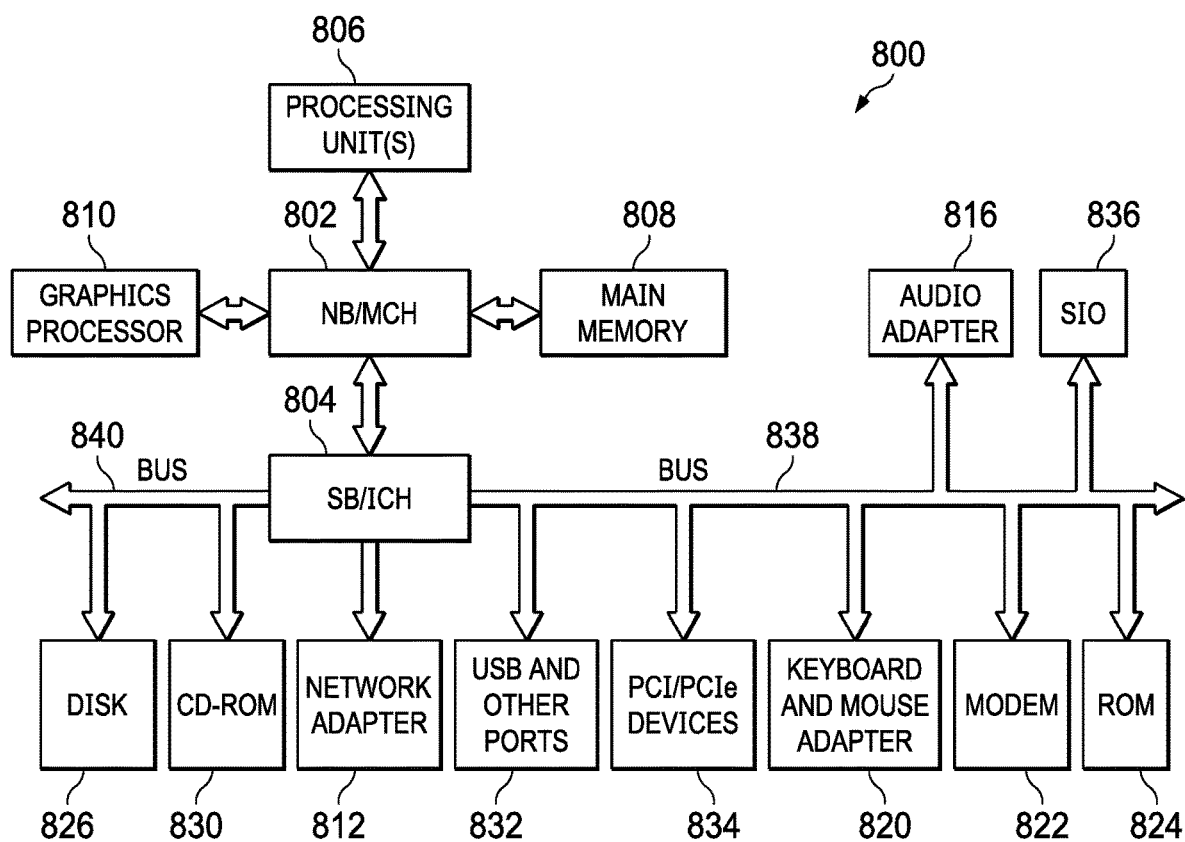
FIG. 8 is an example block diagram of a data processing system in which aspects of the illustrative embodiment may be implemented.

As noted above, the mechanisms of the illustrative embodiments utilize specifically configured computing devices, or data processing systems, to perform the operations for layer-wise differentially private distillation of operational parameters of a trained deep learning neural network model. These computing devices, or data processing systems, may comprise various hardware elements which are specifically configured, either through hardware configuration, software configuration, or a combination of hardware and software configuration, to implement one or more of the systems/subsystems described herein. FIG. 8 is a block diagram of just one example data processing system in which aspects of the illustrative embodiments may be implemented. Data processing system 800 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 may be connected to NB/MCH 802 through an accelerated graphics port (AGP).

In the depicted example, local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 836 may be connected to SB/ICH 804.

An operating system runs on processing unit 806. The operating system coordinates and provides control of various components within the data processing system 800 in FIG. 8. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 800.

As a server, data processing system 800 may be, for example, an IBM eServer™ System p® computer system, Power™ processor based computer system, or the like, running the Advanced Interactive Executive (AIX®) operating system or the LINUX® operating system. Data processing system 800 may be a symmetric multiprocessor (SMP) system including a plurality of processors in processing unit 806. Alternatively, a single processor system may be employed.

Instructions for the operating system, the object-oriented programming system, and applications or programs are located on storage devices, such as HDD 826, and may be loaded into main memory 808 for execution by processing unit 806. The processes for illustrative embodiments of the present invention may be performed by processing unit 806 using computer usable program code, which may be located in a memory such as, for example, main memory 808, ROM 824, or in one or more peripheral devices 826 and 830, for example.

A bus system, such as bus 838 or bus 840 as shown in FIG. 8, may be comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, may include one or more devices used to transmit and receive data. A memory may be, for example, main memory 808, ROM 824, or a cache such as found in NB/MCH 802 in FIG. 8.

As mentioned above, in some illustrative embodiments the mechanisms of the illustrative embodiments may be implemented as application specific hardware, firmware, or the like, application software stored in a storage device, such as HDD 826 and loaded into memory, such as main memory 808, for executed by one or more hardware processors, such as processing unit 806, or the like. As such, the computing device shown in FIG. 8 becomes specifically configured to implement the mechanisms of the illustrative embodiments and specifically configured to perform the operations and generate the outputs described herein with regard to the protection engine and the layer-wise differentially private distillation operations of the protection engine as described herein above.

Those of ordinary skill in the art will appreciate that the hardware in FIGS. 7 and 8 may vary depending on the implementation. Other internal hardware or peripheral devices, such as flash memory, equivalent non-volatile memory, or optical disk drives and the like, may be used in addition to or in place of the hardware depicted in FIGS. 7 and 8. Also, the processes of the illustrative embodiments may be applied to a multiprocessor data processing system, other than the SMP system mentioned previously, without departing from the spirit and scope of the present invention.

Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device that is configured with flash memory to provide non-volatile memory for storing operating system files and/or user-generated data, for example. Essentially, data processing system 800 may be any known or later developed data processing system without architectural limitation.

Figure 9:
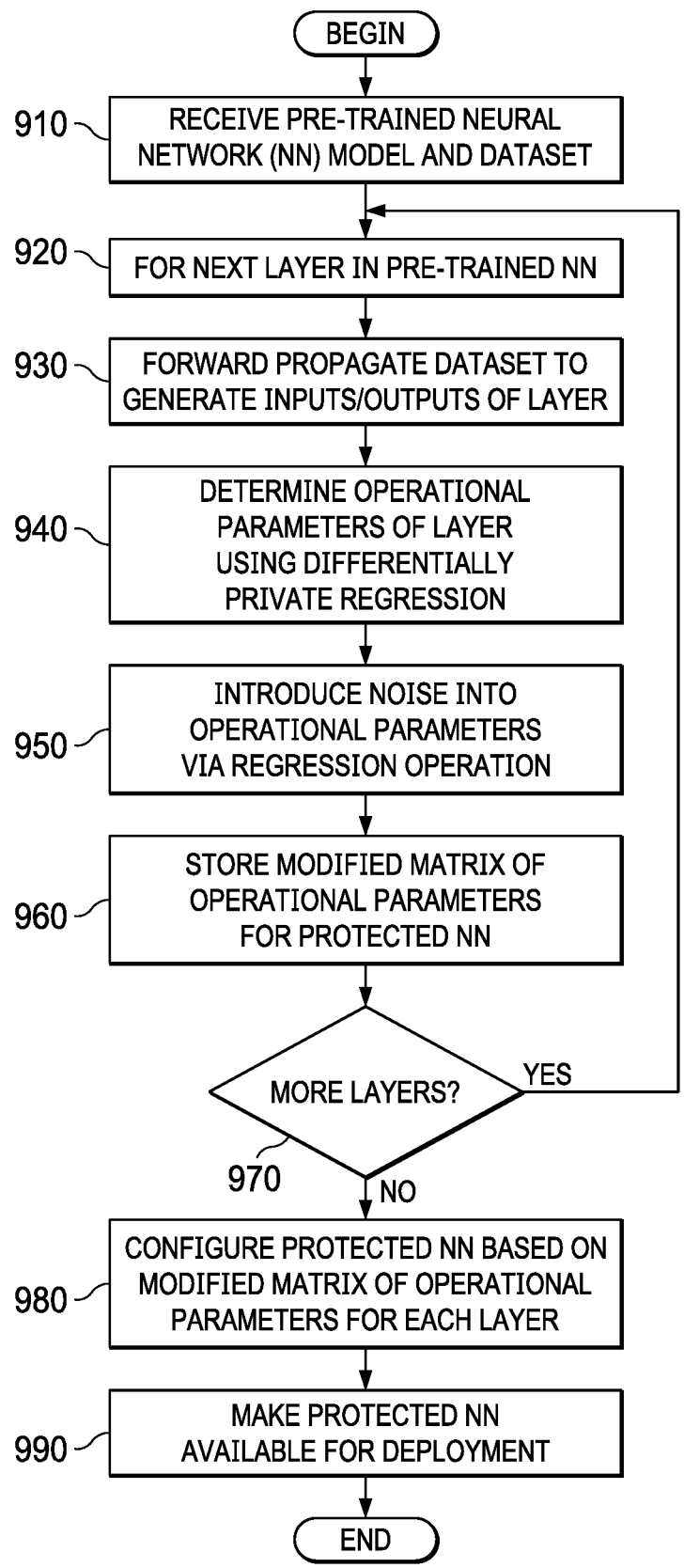
FIG. 9 is a flowchart outlining an example operation of a protection engine for performing sanitization of a pre-trained neural network model in accordance with one illustrative embodiment.

FIG. 9 is a flowchart outlining an example operation of a protection engine for performing sanitization of a pre-trained deep learning neural network model in accordance with one illustrative embodiment. As shown in FIG. 9, the operation starts by receiving a pre-trained neural network model and corresponding dataset (step 910). For a next layer in the pre-trained neural network model (step 920), the dataset is processed, e.g., forward propagated, to generate the inputs and outputs of the corresponding layer (step 930). From the inputs and outputs for the layer, operational parameters of the layer are determined through a differentially private regression operation (step 940) and noise is introduced into the operational parameters via the regression operation (step 950). The modified matrix of operational parameters is stored as operational parameters for a sanitized, or protected, neural network model corresponding to the pre-trained neural network model (step 960). A determination is made as to whether there are additional layers to be processed (step 970). If so, the operation returns to step 920. If there are no more layers to process (step 970), the operation configures a privatized neural network model (also referred to as a sanitized or protected model) based on the modified matrix of operational parameters for each layer (step 980). The resulting privatized neural network model is then made available for deployment (step 990). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions executed by the processor to specifically configure the processor to implement a neural network protection engine, the method comprising:
   receiving, by the neural network protection engine, a pre-trained neural network computer model;
   processing, by the neural network protection engine, a dataset through layers of the pre-trained neural network computer model to compute, for each layer of the pre-trained neural network computer model, inputs and outputs of the layer;
   iteratively, for each layer in a plurality of layers of the pre-trained neural network computer model, performing a differentially private regression operation on the output vector of the layer and pre-activation input values of the layer to generate modified weight values for nodes of the layer which obfuscate aspects of an original training dataset used to train the pre-trained neural network computer model, present in original weight values of the nodes of the layer, wherein the modified weight values for each layer are individually differentially private relative to the training data of the pre-trained neural network computer model, and wherein a set of all of the modified weight values for the plurality of layers are differentially private with respect to the training data; and
   generating, by the neural network protection engine, a first privatized trained neural network model based on the set of all of the modified weight values for the plurality of layers.

2. The method of claim 1, wherein performing the differentially private regression operation on the output vector of the layer and pre-activation input values of the layer comprises introducing noise into original weight values of nodes of the layer to thereby modify the original weight values to generate the modified weight values which adjust at least one of the inputs or outputs of the layer from inputs or outputs that would otherwise be associated with the layer.

3. The method of claim 2, wherein the noise introduced into the original weight values of the nodes of the layer satisfy privacy differential requirements of the original training dataset not being able to be discerned from the weight values of the nodes of the layer, and a predetermined privacy constraint parameter specifying a balance between accuracy of the pre-trained neural network computer model and privatization of the original training dataset.

4. The method of claim 1, further comprising:
   modifying a privacy parameter of the neural network protection engine to generate a new privacy parameter, and repeating the method utilizing the new privacy parameter to generate a second privatized trained neural network model that is different from the first privatized trained neural network model.

5. The method of claim 1, wherein the pre-trained neural network computer model is received from a remotely located computing system, and wherein the first privatized neural network model is returned to the remotely located computing system.

6. The method of claim 1, wherein the neural network protection engine is agnostic as to the pre-trained neural network model architecture and the training algorithm utilized to train the pre-trained neural network model.

7. The method of claim 1, wherein performing the differentially private regression operation on the output vector of the layer and pre-activation input values of the layer comprises:
- performing a forward propagation of a dataset through the plurality of layers of the pre-trained neural network computer model;
- computing, for each layer in the plurality of layers, the pre-activation input values of the layer and the output vector of the layer; and
- iteratively determining, for each layer in the plurality of layers, original weight values of nodes in the layer based on a linear function between the computed pre-activation input values of the layer and the output vector of the layer.

8. The method of claim 1, wherein performing the differentially private regression operation on the output vector of the layer and the pre-activation input values of the layer comprises performing a differentially private ridge regression algorithm.

9. The method of claim 8, wherein the differentially private ridge regression algorithm determines the modified weight values for the layer according to a privacy budget specified as a first parameter c that quantifies a privacy loss and a second parameter specifying an upper bound on a probability of invalidity based on the first parameter.

10. The method of claim 8, wherein the differentially private ridge regression algorithm is executed to solve $\min_{w_1} \Sigma_\mu \|o_1^\mu - W_1 x^\mu\|_2^2$, where the output vectors $o_k^\mu$ are obtained from $h_{k+1} = f_k(o_k)$ and $o_k = W_k h_k$ by forward propagating the inputs $x^\mu$ in training data $D_{train}$, through the pre-trained machine learning computer model $F(x)$, where k is a layer in K layers of the pre-trained machine learning computer model, the vectors $o_k^\mu$ are outputs of the layer k, $W_k$ is the original weight value for the nodes of the layer k, $W_1$ are the modified weight values for the nodes of the layer k, $h_k$ are the inputs to the layer k.

11. A computer program product comprising a computer readable storage medium having a computer readable program stored therein, wherein the computer readable program, when executed on a data processing system, causes the data processing system to specifically configure the data processing system to:
- receive a pre-trained neural network computer model;
- process a dataset through layers of the pre-trained neural network computer model to compute, for each layer of the pre-trained neural network computer model, inputs and outputs of the layer;
- iteratively, for each layer in a plurality of layers of the pre-trained neural network computer model, perform a differentially private regression operation on the output vector of the layer and pre-activation input values of the layer to generate modified weight values for nodes of the layer which obfuscate aspects of an original training dataset used to train the pre-trained neural network computer model, present in original weight values of the nodes of the layer, wherein the modified weight values for each layer are individually differentially private relative to the training data of the pre-trained neural network computer model, and wherein a set of all of the modified weight values for the plurality of layers are differentially private with respect to the training data; and
- generate a first privatized trained neural network model based on the set of all of the modified weight values for the plurality of layers.

12. The computer program product of claim 11, wherein the computer readable program further causes the data processing system to perform the differentially private regression operation on the output vector of the layer and pre-activation input values of the layer at least by introducing noise into original weight values of nodes of the layer to thereby modify the original weight values to generate the modified weight values which adjust at least one of the inputs or outputs of the layer from inputs or outputs that would otherwise be associated with the layer.

13. The computer program product of claim 12, wherein the noise introduced into the original weight values of the nodes of the layer satisfy privacy differential requirements of the original training dataset not being able to be discerned from the weight values of the nodes of the layer, and a predetermined privacy constraint parameter specifying a balance between accuracy of the pre-trained neural network computer model and privatization of the original training dataset.

14. The computer program product of claim 11, wherein the computer readable program further causes the data processing system to:
- modify a privacy parameter of the neural network protection engine to generate a new privacy parameter; and
- repeat the processing and differentially private distillation operation utilizing the new privacy parameter to generate a second privatized trained neural network model that is different from the first privatized trained neural network model.

15. The computer program product of claim 11, wherein the pre-trained neural network computer model is received from a remotely located computing system, and wherein the first privatized neural network model is returned to the remotely located computing system.

16. The computer program product of claim 11, wherein performing the differentially private regression operation on the output vector of the layer and pre-activation input values of the layer comprises:
- performing a forward propagation of a dataset through the plurality of layers of the pre-trained neural network computer model;
- computing, for each layer in the plurality of layers, the pre-activation input values of the layer and the output vector of the layer; and
- iteratively determining, for each layer in the plurality of layers, original weight values of nodes in the layer based on a linear function between the computed pre-activation input values of the layer and the output vector of the layer.

17. The computer program product of claim 11, wherein performing the differentially private regression operation on the output vector of the layer and the pre-activation input values of the layer comprises performing a differentially private ridge regression algorithm.

18. The computer program product of claim 17, wherein the differentially private ridge regression algorithm determines the modified weight values for the layer according to a privacy budget specified as a first parameter c that quantifies a privacy loss and a second parameter specifying an upper bound on a probability of invalidity based on the first parameter.

19. The computer program product of claim 17, wherein the differentially private ridge regression algorithm is executed to solve $\min_{w_1} \Sigma_\mu \|o_1^\mu - W_1 x^\mu\|_2^2$, where the output vectors $o_k^\mu$ are obtained from $h_{k+1}=f_k(o_k)$ and $o_k=W_k h_k$ by forward propagating the inputs $x^\mu$ in training data $D_{train}$, through the pre-trained machine learning computer model $F(x)$, where k is a layer in K layers of the pre-trained machine learning computer model, the vectors $o_k^\mu$ are outputs of the layer k, $W_k$ is the original weight value for the nodes of the layer k, $W_1$ are the modified weight values for the nodes of the layer k, $h_k$ are the inputs to the layer k.

20. A data processing system comprising:
    at least one processor; and
    at least one memory coupled to the at least one processor, wherein the at least one memory comprises instructions which, when executed by the at least one processor, cause the at least one processor to specifically configure the at least one processor to:
    receive a pre-trained neural network computer model;
    process a dataset through layers of the pre-trained neural network computer model to compute, for each layer of the pre-trained neural network computer model, inputs and outputs of the layer;
    iteratively, for each layer in a plurality of layers of the pre-trained neural network computer model, perform a differentially private regression operation on the output vector of the layer and pre-activation input values of the layer to generate modified weight values for nodes of the layer which obfuscate aspects of an original training dataset used to train the pre-trained neural network computer model, present in original weight values of the nodes of the layer, wherein the modified weight values for each layer are individually differentially private relative to the training data of the pre-trained neural network computer model, and wherein a set of all of the modified weight values for the plurality of layers are differentially private with respect to the training data; and
    generate a first privatized trained neural network model based on the set of all of the modified weight values for the plurality of layers.

* * * * *